(12) United States Patent
Ishida

(10) Patent No.: US 7,819,155 B2
(45) Date of Patent: Oct. 26, 2010

(54) RUBBER COMPOSITION FOR TIRE AND PNEUMATIC TIRE USING THE SAME

(75) Inventor: Hirokazu Ishida, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 219 days.

(21) Appl. No.: 11/074,779

(22) Filed: Mar. 9, 2005

(65) Prior Publication Data

US 2005/0211360 A1 Sep. 29, 2005

(30) Foreign Application Priority Data

Mar. 25, 2004 (JP) ............................. 2004-089927
Mar. 25, 2004 (JP) ............................. 2004-089928

(51) Int. Cl.
*B60C 15/06* (2006.01)
*B60C 5/14* (2006.01)
*B60C 1/00* (2006.01)

(52) U.S. Cl. ...................... 152/510; 152/543; 152/547

(58) Field of Classification Search ................ 152/510, 152/543, DIG. 16, 547
See application file for complete search history.

(56) References Cited

U.S. PATENT DOCUMENTS

| 5,225,457 | A | | 7/1993 | Borowczak et al. | |
|---|---|---|---|---|---|
| 5,948,503 | A | * | 9/1999 | Yamamoto et al. | 428/113 |
| 6,073,669 | A | * | 6/2000 | Takada et al. | 152/510 |
| 6,391,971 | B1 | * | 5/2002 | Teratani | 525/179 |
| 6,817,954 | B2 | * | 11/2004 | Sano | 473/282 |
| 2003/0114251 | A1 | * | 6/2003 | Fushihara et al. | 473/371 |
| 2003/0176577 | A1 | * | 9/2003 | Sano | 525/178 |
| 2004/0123927 | A1 | | 7/2004 | Ueyoko et al. | |

FOREIGN PATENT DOCUMENTS

| CN | 1057274 | A | | 12/1991 |
|---|---|---|---|---|
| EP | 448905 | A1 | * | 10/1991 |
| EP | 1350639 | A1 | * | 10/2003 |
| JP | 63-82802 | A | * | 4/1988 |
| JP | 7-81335 | A | | 3/1995 |
| JP | 7-137507 | A | | 5/1995 |
| JP | 7-266813 | A | | 10/1995 |

(Continued)

OTHER PUBLICATIONS

S. Yamamoto, H. Sato, K. Fujii, K. Ishiguchi, "New Type of Fine Fiber Reinforced Rubber Composites Prepared from Rubber/Polyolefin/Nylon Graft Copolymer," Nihon Reoroji Gakkaishi, vol. 25, No. 5, pp. 275-282 (1997).*

(Continued)

*Primary Examiner*—Geoffrey L Knable
(74) *Attorney, Agent, or Firm*—Birch, Stewart, Kolasch & Birch LLP

(57) ABSTRACT

The present invention provides a rubber composition for a tire that is capable of improving air permeability resistance while preventing chipping of the bead toe and a pneumatic tire comprising the rubber composition. Specifically, the present invention relates to a rubber composition for a tire containing a composite material comprising rubber, polyolefin and nylon; the composite material being contained so that the content of nylon is 1 to 40 parts by weight based on 100 parts by weight of the total rubber component in the rubber composition.

4 Claims, 3 Drawing Sheets

FOREIGN PATENT DOCUMENTS

| | | | |
|---|---|---|---|
| JP | 7-315015 A | | 12/1995 |
| JP | 7-330961 A | | 12/1995 |
| JP | 8-3368 A | | 1/1996 |
| JP | 09-48210 A | * | 2/1997 |
| JP | 10245452 A | | 9/1998 |
| JP | 11-59142 A | | 3/1999 |
| JP | 11-59143 A | | 3/1999 |
| JP | 11-209516 A | | 8/1999 |
| JP | 2001-233013 A | | 8/2001 |
| JP | 2002-166710 A | | 6/2002 |
| JP | 2002-205508 A | | 7/2002 |
| JP | 2005-60495 A | | 3/2005 |

OTHER PUBLICATIONS

Translation of Nihon Reoroji Gakkaishi, vol. 25, No. 5, pp. 275-282 (1997).*

Maolin et al., "Study on Compatible Blends of EPDM and PA," China Synthetic Rubber Industry, vol. 24, No. 6, Nov. 15, 2001, 361-364.

* cited by examiner

RUBBER COMPOSITION FOR TIRE AND PNEUMATIC TIRE USING THE SAME

BACKGROUND OF THE INVENTION

The present invention relates to a rubber composition for a tire and a pneumatic tire comprising the same.

In recent years, in order to improve properties that inhibit chipping of the bead toe of a tire (toe-chip resistance) and air permeability resistance, attempts are being made to improve the rubber composition used particularly for the chafer rubber or the inner liner among tire parts.

As a rubber composition for a chafer, elasticity is made high by using a rubber composition comprising natural rubber and butadiene rubber, in order to endure abrasion by the wheel rim flange and high load and prevent toe-chip (see JP-A-11-59143). However, chipping of the bead toe when attaching and detaching the rim and separation from the inner liner occur and there is the problem that air permeability resistance is poor.

Also, conventionally, a large amount of butadiene rubber (BR) is compounded in rubber compositions for chafers in order to suppress abrasion and heat generation. However, because BR tends to be deformed, a large amount of carbon black is added to harden the rubber and in such a case, chipping of the bead toe occurs when reassembling to the rim.

As a means to solve such problems, the method of using soft rubber only for the bead toe is suggested (see JP-A-7-81335), but according to this method, air permeability resistance cannot be improved. In order to improve air permeability resistance, the inner liner can be extended to the tip of the bead toe, but in such a case, separation occurs when assembling to the rim.

As shown in FIG. 3 which depicts a cross-sectional view of the bead of a pneumatic tire, the inner liner of a conventional pneumatic tire is usually positioned so that the end is located near bead core 6 or tucked beneath bead core 6. For bead toe 3, the same rubber is used as that used for the part that is worn out by the wheel rim flange (chafer rubber 2).

Consequently, in a structure as shown in FIG. 3 wherein the chafer rubber extends to the inside of the wheel, the air inside the tire cannot completely be sealed. When the inner liner is provided to the bead toe in order to seal in the air, problems such as separation and tearing of the inner liner occur when attaching and detaching the rim.

In this way, a rubber composition that can sufficiently improve toe-chip resistance and air permeability resistance of a tire has not yet been obtained.

SUMMARY OF THE INVENTION

The present invention aims to provide a rubber composition for a tire that is capable of improving air permeability resistance while preventing chipping of the bead toe and a pneumatic tire comprising the rubber composition.

The present invention relates to a rubber composition for a tire containing a composite material comprising rubber, polyolefin and nylon; the composite material being contained so that the content of nylon is 1 to 40 parts by weight based on 100 parts by weight of the total rubber component in the rubber composition.

The nylon is preferably fibrous nylon or particulate nylon.

The present invention also relates to a pneumatic tire having a chafer rubber comprising the rubber composition for a tire.

Furthermore, the present invention relates to a pneumatic tire having an inner liner comprising the rubber composition for a tire, wherein the end of the inner liner extends to at least the bead toe.

DETAILED DESCRIPTION

Figure 1:
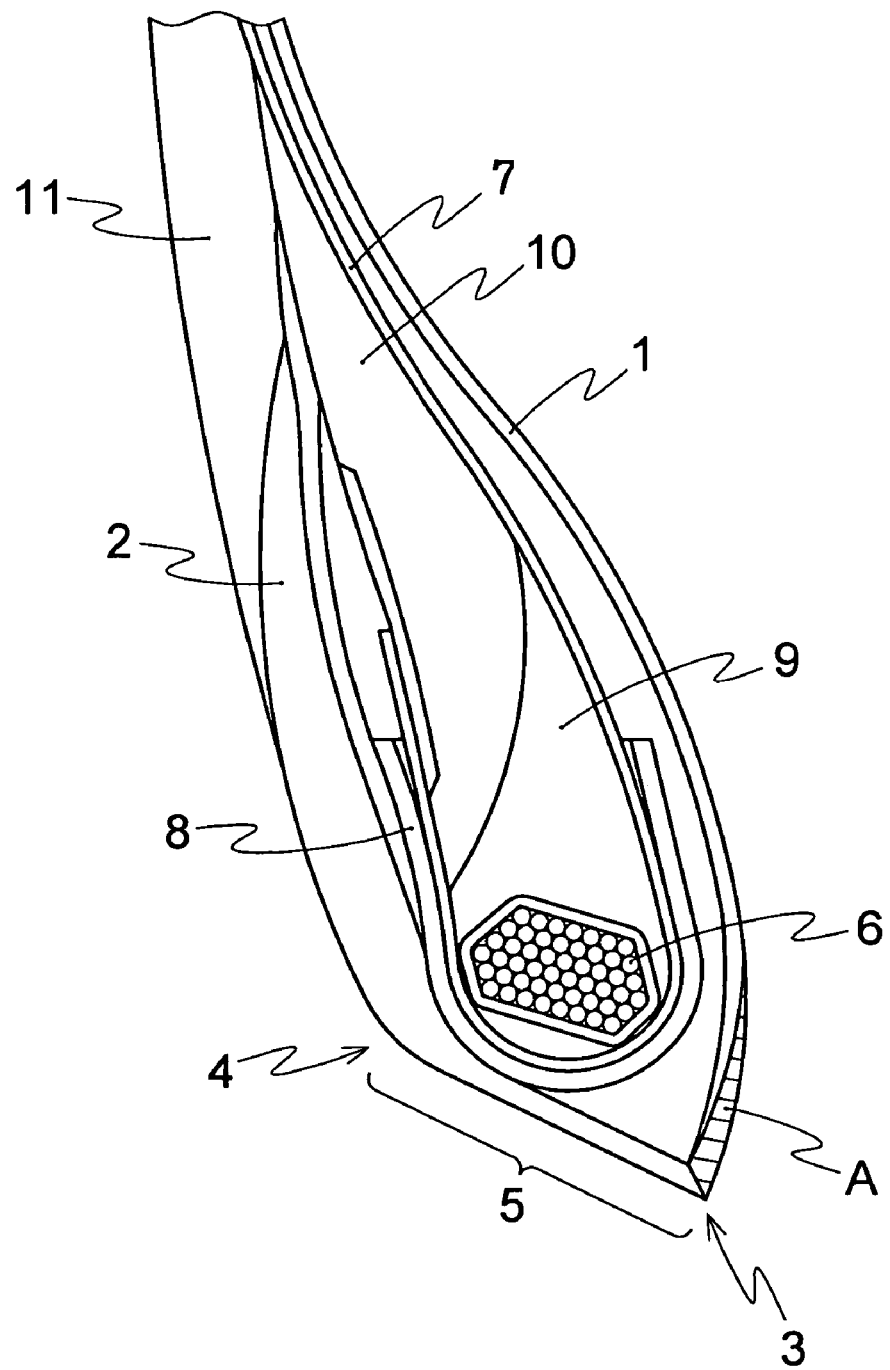
FIG. 1 is a cross sectional view depicting the bead of a pneumatic tire having chafer rubber A comprising the rubber composition for a tire of the present invention.

The rubber composition for a tire of the present invention contains a composite material comprising rubber, polyolefin and nylon.

Examples of the rubber are butyl rubber such as butyl rubber (IIR) and halogenated butyl rubber and bromides of isobutylene-P-methylstyrene copolymer. Examples of the halogenated butyl rubber are brominated butyl rubber (Br-IIR) and chlorinated butyl rubber (Cl-IIR). From the viewpoint that air permeability resistance is excellent, butyl rubber is preferable and particularly, halogenated butyl rubber which has a high vulcanization rate is more preferable.

The content of rubber in the composite material is preferably at least 25% by weight, more preferably at least 30% by weight. When the content of rubber is less than 25% by weight, the binding force between the rubber and nylon tends to weaken. Also, the content of rubber is preferably at most 50% by weight, more preferably at most 45% by weight. When the content is more than 50% by weight, preparing pellets of the composite material tends to become difficult (processability when preparing the composite material becomes poor).

Examples of the polyolefin are polymers of alkene having 2 to 3 carbon atoms such as high-density polyethylene (HDPE) and polypropylene. Particularly, HDPE is preferable from the viewpoint of processability when preparing the composite material.

The content of polyolefin in the composite material is preferably at least 15% by weight, more preferably at least 20% by weight. When the content of polyolefin is less than 15% by weight, processability when preparing the composite material becomes poor (preparing pellets of the composite material becomes difficult). Also, the content of polyolefin is preferably at most 35% by weight, more preferably at most 30% by weight. When the content is more than 35% by weight, the anchor effect of the polyolefin becomes small and as a result, the binding force between the rubber and nylon tends to weaken.

Examples of the nylon are nylon 6 and nylon 66.

The content of nylon in the composite material is preferably at least 25% by weight, more preferably at least 30% by weight. When the content of nylon is less than 25% by weight, the reinforcing effect tends to become small. Also, the content of nylon is preferably at most 40% by weight, more preferably at most 35% by weight. When the content is more than 40% by weight, processability when preparing the composite material tends to become poor.

The composite material is composed of the three components of rubber, polyolefin and nylon, which are chemically bonded with each other, and preferably has a structure in which fine fibers or particles of nylon are uniformly dispersed in a matrix comprising the rubber and polyolefin. Due to being a copolymer of rubber and nylon, the composite material has excellent reinforcing properties. In the case that nylon is merely compounded to rubber, the bond with the polymer is weak and the composite material becomes a site for crack. Fibrous nylon is anisotropic and increases elasticity in the extrusion direction. In the case of fibrous nylon, the fibers are preferably oriented in the circumferential direction of the tire to obtain the advantage of preventing chipping of the toe bead when attaching and detaching the rim. On the other hand, particulate nylon is not anisotropic and therefore has the advantage of acting effectively to forces from all directions.

When fibrous nylon is used, the average fiber diameter of the fiber is preferably at most 0.5 μm, more preferably at most 0.2 μm. When the average fiber diameter is more than 0.5 μm, the bond between the rubber and the fiber tends to weaken.

The average fiber length is preferably at least 50 μm, more preferably at least 100 μm. When the average fiber length is less than 50 μm, the reinforcing effect tends to decrease. Also, the average fiber length is preferably at most 200 μm, more preferably at most 100 μm. When the average fiber length is more than 200 μm, the bond between the rubber and the fiber tends to weaken.

The average aspect ratio of the fiber is preferably at least 200, more preferably at least 500. When the average aspect ratio is less than 200, anisotropy tends to be small. Also, the average aspect ratio is preferably at most 2000. When the average aspect ratio is more than 2000, the bond between the rubber and the fiber tends to weaken.

When particulate nylon is used, the average particle size of the particles is preferably at least 0.5 μm, more preferably at least 2 μm. When the average particle size is less than 0.5 μm, the reinforcing effects tend to decrease. Also, the average particle size is preferably at most 5 μm, more preferably at most 3 μm. When the average particle size is more than 5 μm, the binding force between the rubber and nylon tends to decrease.

The composite material can be prepared by the three steps of (1) the step of kneading and reacting the rubber and polyolefin, (2) the step of reacting the rubber-polyolefin and nylon and (3) the step of fiber spinning. Specifically, in step (1), the rubber, polyolefin and a reacting agent (such as a vinyl-type silane coupling agent) are added to a Banbury mixer and a kneaded reactant is obtained. At this point, the reactant has a sea-island structure wherein the polyolefin phase is the sea and the rubber phase is the island and is in the form of pellets. Then, in step (2), the kneaded reactant and nylon are supplied to a twin-screw extruder together with a reacting agent and a ternary graft copolymer of rubber-polyolefin-nylon is obtained. By controlling the grafting ratio, the nylon is dispersed in the rubber-polyolefin matrix as particles of 0.2 to 3 μm. Subsequently, in step (3), the copolymer is extruded from a nozzle attached to the tip of the twin-screw extruder and spun into fiber. The nylon particles in the strands of the extruded article are transformed into fiber. If a reactive resin (such as glycidyl methacrylate) is added and then fiber spinning is conducted, the nylon can maintain its particle form. Pellets of the composite material are obtained through the above steps.

Specific examples of the composite material are "Butyl SHP (containing fibrous nylon)" (composition: IIR 40% by weight, polyolefin 27% by weight, nylon 33% by weight, shape: pellet-shaped solid of 2 mm diameter and 5 mm length) and "Butyl SHP (containing particulate nylon)" (composition: IIR 31% by weight, polyolefin 21% by weight, nylon 33% by weight, reactive resin 15% by weight, shape: pellet-shaped solid of 2 mm diameter and 5 mm length) available from Daiwa Polymer Co., Ltd.

The rubber composition for a tire of the present invention contains the composite material so that the content of nylon is at least 1 part by weight, preferably at least 10 parts by weight, more preferably at least 20 parts by weight based on 100 parts by weight of the total rubber component in the rubber composition. When the content is less than 1 part by weight, reinforcing properties decrease. Also, the rubber composition contains the composite material so that the content of nylon is at most 40 parts by weight, preferably at most 35 parts by weight, more preferably at most 30 parts by weight, further preferably at most 25 parts by weight. When the content is more than 40 parts by weight, the hardness increases and particularly, when the rubber composition is used for chafer rubber, toe-chip resistance decreases. Also, when the rubber composition for a tire is used for the inner liner, the rubber composition contains the composite material so that the content of nylon is at most 30 parts by weight in view of preventing cracks.

Besides the rubber in the composite material, the rubber composition for a tire of the present invention can contain normal rubber. By compounding the composite material together with rubber, an elastomer having excellent durability is obtained. The rubber is not particularly limited and examples are natural rubber (NR), butadiene rubber (BR), butyl rubber such as IIR and halogenated butyl rubber, chloroprene rubber, bromides of isobutylene-p-methylstyrene copolymer and silicone rubber. Examples of the halogenated butyl rubber are Br-IIR and Cl-IIR. Of these, from the viewpoint that air permeability resistance is excellent, butyl rubber is preferable and halogenated butyl rubber is particularly preferable. These can be used alone or mixtures thereof can be used.

When the rubber composition for a tire of the present invention is used as chafer rubber, butyl rubber is preferably the main component and contained in an amount of at least 50% by weight, more preferably at least 60% by weight in the total rubber component contained in the rubber composition (total of the rubber component in the composite material and the other rubber components). When the amount of butyl rubber is less than 50% by weight, air permeability resistance tends to decrease.

When the rubber composition for a tire of the present invention is used as the inner liner, butyl rubber is preferably contained as the total rubber component in the rubber composition (total of the rubber component in the composite material and the other rubber components) and more preferably, only butyl rubber is contained.

The rubber composition for a tire of the present invention preferably contains at least 1 part by weight, preferably at least 10 parts by weight, more preferably at least 20 parts by weight of a nylon component, based on 100 parts by weight of the total rubber component in the rubber composition. When the nylon content is less than 1 part by weight, the reinforcing effect tends to be small. Also, the nylon component is at most 40 parts by weight, preferably at most 35 parts by weight, more preferably at most 30 parts by weight, further preferably 25 parts by weight. When the content is more than 40 parts by weight, the hardness increases and particularly, when the rubber composition is used for chafer rubber, toe-chip resistance decreases. Also, when the rubber composition for a tire is used for the inner liner, the content of the nylon is preferably at most 30 parts by weight in view of preventing cracks.

Furthermore, the rubber composition for a tire of the present invention can contain compounding agents that are usually used in a rubber composition, such as inorganic fillers including carbon black and silica, wax, antioxidants, stearic acid, zinc oxide, extending oils, vulcanizing agents and vulcanization accelerators.

As the carbon black, GPF, HAF, ISAF and SAF can be used. When the rubber composition used for the inner liner, the content of carbon black is not particularly limited. When the rubber composition is used for chafer rubber, the content of carbon black is not particularly limited, but is preferably at least 30 parts by weight, more preferably at least 50 parts by weight based on 100 parts by weight of the total rubber component in the rubber composition. When the content of carbon black is less than 30 parts by weight, reinforcing properties tend to decrease. Also, the content of carbon black is preferably at most 70 parts by weight, more preferably at most 60 parts by weight. When the content is more than 70 parts by weight, the hardness tends to become too high.

The rubber composition for a tire of the present invention can be obtained by kneading the composite material, the rubber component and when necessary, the other compounding agents using the usual processing machine, such as a roll, a Banbury mixer and a kneader.

Of the chafer rubber of the bead of a pneumatic tire, the rubber composition for a tire of the present invention is preferably used for the chafer rubber of the inner liner. By compounding butyl rubber as the main component in the chafer rubber for the inner liner and forming the inner liner to extend to the bead toe, air permeability resistance of the tire can be improved.

A cross-sectional view of one example of the bead of a pneumatic tire having chafer rubber A comprising the rubber composition for a tire of the present invention is shown in FIG. 1. In FIG. 1, 1 is the inner liner, 2 is the chafer rubber, 3 is the bead toe, 4 is the bead heel, 5 is the bead base, 6 is the bead core, 7 is the carcass, 8 is the filler, 9 is the hard apex, 10 is the soft apex and 11 is the sidewall rubber. Area A, which is more on the inner liner side than bead toe 3 of chafer rubber 2, is composed of the rubber composition for a tire of the present invention. The remaining part of chafer rubber 2 (sidewall side) can be composed of the conventional chafer rubber composition.

The position of the chafer rubber A comprising the rubber composition for a tire of the present invention on the bead base does not necessarily need to be at the tip of bead toe 3 as shown in FIG. 1 and the chafer rubber A can be provided to a position that is at most 0.2 time the width of bead base 5 (length of bead toe 3 to bead heel 4) from the tip of bead toe 3. When the rubber composition for a chafer of the present invention is used to a position past 0.2 time the width from the bead toe, deformation of the rubber after assembling to the rim tends to be large.

Figure 2:
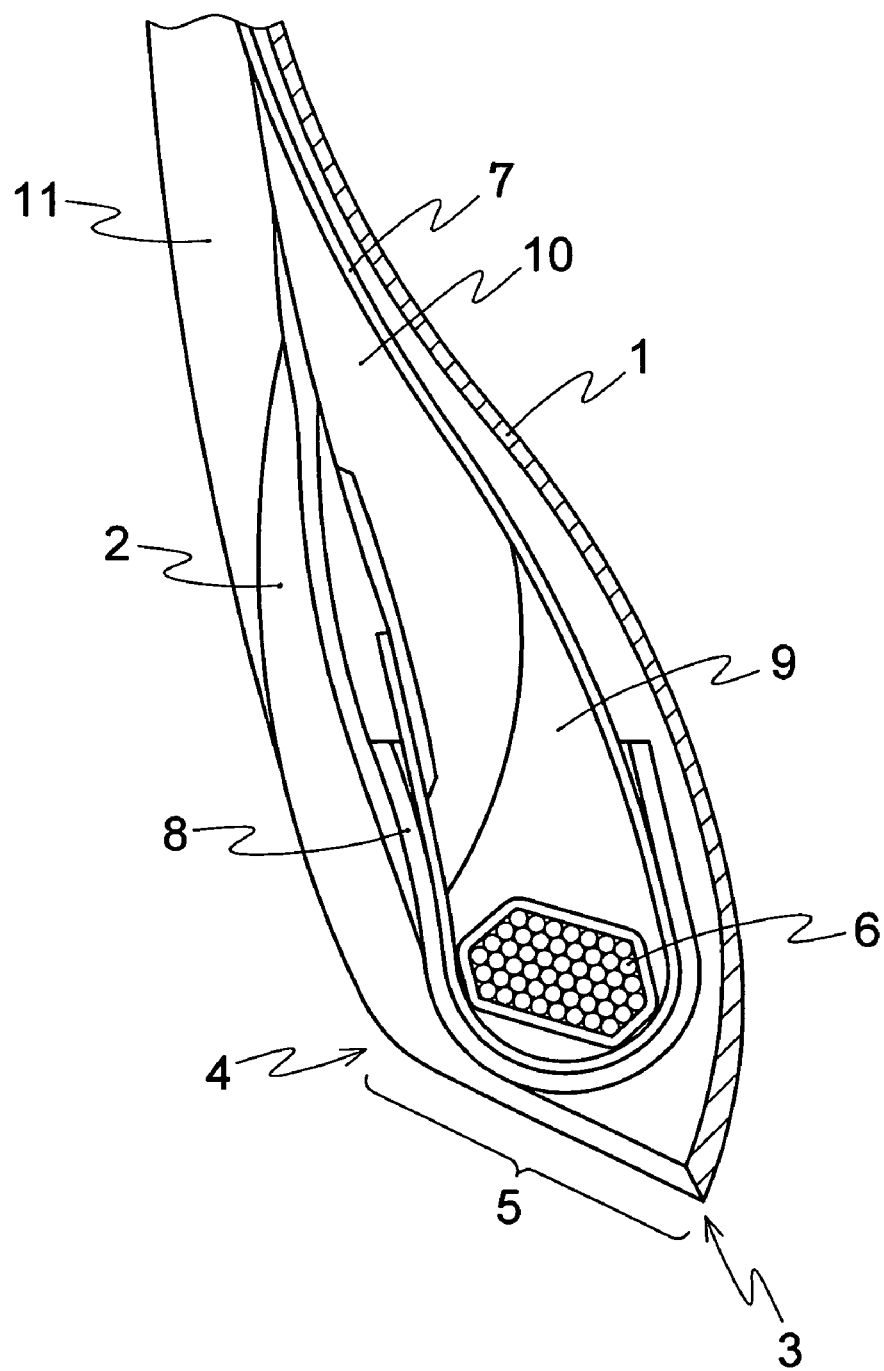
FIG. 2 is a cross sectional view depicting the bead of a pneumatic tire having inner liner 1 comprising the rubber composition for a tire of the present invention.

A cross-sectional view of the bead in one embodiment of the pneumatic tire of the present invention is shown in FIG. 2. Numerals 1 to 11 in FIG. 2 are the same as those in FIG. 1.

The inner liner 1 in FIG. 2 comprises the rubber composition for a tire of the present invention and the end of the inner liner extends to at least bead toe 3. By using a rubber composition containing a specific composite material, the end of the inner liner can be extended to the bead toe and as a result, air permeability resistance of the tire can be improved. The end of inner liner 1 is preferably at a position that is at most 0.2 time the width of bead base 5 (length of bead toe 3 to bead heel 4) from the tip of bead toe 3. When the end of the inner liner extends to a position past 0.2 time the width from the bead toe, deformation of the rubber after assembling to the rim tends to be large.

The pneumatic tire of the present invention preferably has chafer rubber or an inner liner comprising the rubber composition for a tire of the present invention. The pneumatic tire is prepared by the usual method.

Hereinafter, the present invention is explained in detail by means of Examples, but the present invention is not limited thereto.

The various chemicals used in Examples are shown below.
Br-IIR: 2255 available from Exxon Mobil Chemical Japan
NR: RSS #3
BR: 150B available from Ube Industries, Ltd.
VC-BR: VCR412 available from Ube Industries, Ltd.
Butyl SHP: (Br-IIR 32% by weight, nylon (particle, average particle size: 2 μm, type: nylon 6) 33% by weight, HDPE 20% by weight, reactive resin 15% by weight) available from Daiwa Polymer Co., Ltd.
Carbon black 1: CB N660 (Niteron #554) available from Nippon Steel Chemical Carbon Co., Ltd.
Carbon black 2: CB N330 available from Tokai Carbon Co., Ltd.
Process oil: JOMO Process X-140 available from Japan Energy Corporation
Zinc oxide: Zinc Oxide Type 1 available from Mitsui Mining and Smelting Co., Ltd
Stearic acid: Stearic acid available from NOF Corporation
Antioxidant: Antigen 6C available from Sumitomo Chemical Co., Ltd.
Wax: OZOACE-0355 available from Nippon Seiro Co., Ltd.
Sulfur: powdery sulfur available from Tsurumi Chemicals Co., Ltd.
Vulcanization accelerator DM: Sanceler DM available from Sanshin Chemical Industry Co., Ltd.
Vulcanization accelerator NS: Sanceler NS available from Sanshin Chemical Industry Co., Ltd.

EXAMPLES 1 TO 13 AND COMPARATIVE EXAMPLES 1 TO 4

(Preparation Method)

The components other than sulfur, zinc oxide and the vulcanization accelerator were kneaded according to the composition shown in Table 1 using a Banbury mixer under the conditions of kneading temperature of 100 to 150° C. and kneading time of 5 to 10 minutes. Subsequently, sulfur, zinc oxide and the vulcanization accelerator were added and kneading was conducted using an open roll under the conditions of kneading temperature of 60 to 100° C. and kneading time of 5 to 10 minutes. The obtained rubber composition was extrusion molded using an extruder.

As shown in FIG. 1, a tire having tire size of TL 11R22.5 14PR was prepared using the obtained rubber for area A which is more on the inner liner side than bead toe 3 of chafer rubber 2.

(Testing Method)

The prepared tire was evaluated in the following manner.

<Toe-Chip Resistance>

Each tire was mounted on the drive axle of a 10-ton truck and the truck was driven for 100,000 km. Thereafter, attaching and detaching of the rim was repeated for each tire and the tires were evaluated on a scale of 5 by the number and size of toe-chip. 5 indicates that no chipping was found. The lower the rating indicates that toe-chip occurs more frequently and is larger.

<Air Permeability Resistance>

Each tire was mounted on the drive axle of a 10-ton truck and the degree of decrease in inner pressure was observed every two months. The pressure of each tire was represented as an index based on Comparative Example 1 as 100 (standard). The larger the index is the better the air permeability resistance.

The test results are shown in Table 1.

TABLE 1

|  | Ex. | | | | | | | | |
|---|---|---|---|---|---|---|---|---|---|
|  | 1 | 2 | 3 | 4 | 5 | 6 | 7 | 8 | 9 |
| Composition (parts by weight) | | | | | | | | | |
| Br-IIR | 97.76 | 93.6 | 87.2 | 80.8 | 68 | 61.6 | 77.2 | 67.2 | 57.2 |
| NR | 0 | 0 | 0 | 0 | 0 | 0 | 10 | 20 | 30 |
| BR | 0 | 0 | 0 | 0 | 0 | 0 | 0 | 0 | 0 |
| VC-BR | 0 | 0 | 0 | 0 | 0 | 0 | 0 | 0 | 0 |
| Butyl SHP | 7 | 20 | 40 | 60 | 100 | 120 | 40 | 40 | 40 |
| Carbon black 1 | 60 | 60 | 60 | 60 | 60 | 60 | 55 | 55 | 55 |
| Carbon black 2 | 0 | 0 | 0 | 0 | 0 | 0 | 0 | 0 | 0 |
| Process oil | 10 | 10 | 10 | 10 | 10 | 10 | 10 | 10 | 10 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antioxidant 6C | 0 | 0 | 0 | 0 | 0 | 0 | 0 | 0 | 0 |
| Wax | 0 | 0 | 0 | 0 | 0 | 0 | 0 | 0 | 0 |
| Sulfur | 1 | 1 | 1 | 1 | 1 | 1 | 1 | 1 | 1 |
| Vulcanization accelerator DM | 1.5 | 1.5 | 1.5 | 1.5 | 1.5 | 1.5 | 1.5 | 1.5 | 1.5 |
| Vulcanization accelerator NS | 0 | 0 | 0 | 0 | 0 | 0 | 0 | 0 | 0 |
| Nylon content (parts by weight) | 2.31 | 6.6 | 13.2 | 19.8 | 33 | 39.6 | 13.2 | 13.2 | 13.2 |
| Butyl content in SHP (parts by weight) | 2.24 | 6.4 | 12.8 | 19.2 | 32 | 38.4 | 12.8 | 12.8 | 12.8 |
| Evaluation results | | | | | | | | | |
| Toe-chip | 3 | 4 | 5 | 5 | 5 | 3 | 5 | 5 | 5 |
| Air permeability resistance | 100 | 100 | 100 | 100 | 100 | 100 | 99 | 97 | 95 |

|  | Ex. | | | | Com. Ex. | | | |
|---|---|---|---|---|---|---|---|---|
|  | 10 | 11 | 12 | 13 | 1 | 2 | 3 | 4 |
| Composition (parts by weight) | | | | | | | | |
| Br-IIR | 47.2 | 57.2 | 68 | 98.4 | 100 | 58.4 | 0 | 0 |
| NR | 40 | 15 | 0 | 0 | 0 | 0 | 30 | 50 |
| BR | 0 | 15 | 0 | 0 | 0 | 0 | 70 | 25 |
| VC-BR | 0 | 0 | 0 | 0 | 0 | 0 | 0 | 25 |
| Butyl SHP | 40 | 40 | 100 | 5 | 0 | 130 | 0 | 0 |
| Carbon black 1 | 55 | 55 | 30 | 60 | 60 | 60 | 0 | 0 |
| Carbon black 2 | 0 | 0 | 0 | 0 | 0 | 0 | 80 | 70 |
| Process oil | 10 | 10 | 10 | 10 | 10 | 10 | 3 | 3 |
| Zinc oxide | 3 | 3 | 3 | 3 | 3 | 3 | 5 | 5 |
| Stearic acid | 1 | 1 | 1 | 1 | 1 | 1 | 2 | 2 |
| Antioxidant 6C | 0 | 0 | 0 | 0 | 0 | 0 | 3 | 3 |
| Wax | 0 | 0 | 0 | 0 | 0 | 0 | 1 | 1 |
| Sulfur | 1 | 1 | 1 | 1 | 1 | 1 | 3 | 3 |
| Vulcanization accelerator DM | 1.5 | 1.5 | 1.5 | 1.5 | 1.5 | 1.5 | 0 | 0 |
| Vulcanization accelerator NS | 0 | 0 | 0 | 0 | 0 | 0 | 1 | 1 |
| Nylon content (parts by weight) | 13.2 | 13.2 | 33 | 1.65 | 0 | 42.9 | 0 | 0 |
| Butyl content in SHP (parts by weight) | 12.8 | 12.8 | 32 | 1.6 | 0 | 41.6 | 0 | 0 |
| Evaluation results | | | | | | | | |
| Toe-chip | 5 | 5 | 4 | 3 | 2 | 2 | 1 | 1 |
| Air permeability resistance | 93 | 95 | 100 | 100 | 100 | 100 | 87 | 85 |

EXAMPLES 14 TO 20 AND COMPARATIVE EXAMPLE 5

(Preparation Method)

The components other than sulfur, zinc oxide and the vulcanization accelerator were kneaded according to the composition shown in Table 2 using a Banbury mixer under the conditions of kneading temperature of 100 to 150° C. and kneading time of 5 to 10 minutes. Subsequently, sulfur, zinc oxide and the vulcanization accelerator were added and kneading was conducted using an open roll under the conditions of kneading temperature of 60 to 100° C. and kneading time of 5 to 10 minutes. The obtained rubber composition was extruded using an extruder and molded into an inner liner.

As shown in FIG. 2, a tire having tire size of TL 11R22.5 14PR was prepared using the obtained inner liner so that the end of the inner liner is positioned at bead toe 3.

(Testing Method)

<Crack of Inner Liner>

Each tire was mounted on the drive axle of a 10-ton truck and the truck was driven for 100,000 km. Thereafter, the inner liner was observed for cracks. ○ indicates that there are no cracks.

The toe-chip test was conducted in the same manner as in Examples 1 to 13 and Comparative Examples 1 to 4. The air permeability resistance test was conducted in the same manner as in Examples 1 to 13 and Comparative Examples 1 to 4, except that the pressure of the tire was represented as an index based on Comparative Example 5 as 100 (standard).

TABLE 2

| | Ex. | | | | | | | Com. Ex. |
|---|---|---|---|---|---|---|---|---|
| | 14 | 15 | 16 | 17 | 18 | 19 | 20 | 5 |
| Composition (parts by weight) | | | | | | | | |
| Br-IIR | 97.76 | 93.6 | 87.2 | 80.8 | 74.4 | 71.2 | 98.4 | 100 |
| Butyl SHP | 7 | 20 | 40 | 60 | 80 | 90 | 5 | 0 |
| Carbon black 1 | 55 | 50 | 40 | 30 | 20 | 15 | 58 | 60 |
| Process oil | 10 | 10 | 10 | 10 | 10 | 10 | 10 | 10 |
| Zinc oxide | 3 | 3 | 3 | 3 | 3 | 3 | 3 | 3 |
| Stearic acid | 1 | 1 | 1 | 1 | 1 | 1 | 1 | 1 |
| Sulfur | 1 | 1 | 1 | 1 | 1 | 1 | 1 | 1 |
| Vulcanization accelerator DM | 1.5 | 1.5 | 1.5 | 1.5 | 1.5 | 1.5 | 1.5 | 1.5 |
| Nylon content (parts by weight) | 2.31 | 6.6 | 13.2 | 19.8 | 26.4 | 29.7 | 1.65 | 0 |
| Butyl content in SHP (parts by weight) | 2.24 | 6.4 | 12.8 | 19.2 | 25.6 | 28.8 | 1.6 | 0 |
| Evaluation results | | | | | | | | |
| Toe-chip | 3 | 4 | 5 | 5 | 5 | 5 | 3 | 2 |
| Crack of inner liner | ○ | ○ | ○ | ○ | ○ | ○ | ○ | ○ |
| Air permeability resistance | 100 | 100 | 100 | 100 | 100 | 100 | 100 | 100 |

The results are shown in Table 2. In Examples 14 to 20 wherein a suitable amount of butyl SHP was compounded, problems such as toe-chip and cracking of the inner liner did not occur. In contrast, in Comparative Example 5 wherein butyl SHP was not compounded, toe-chip occurred.

Figure 3:
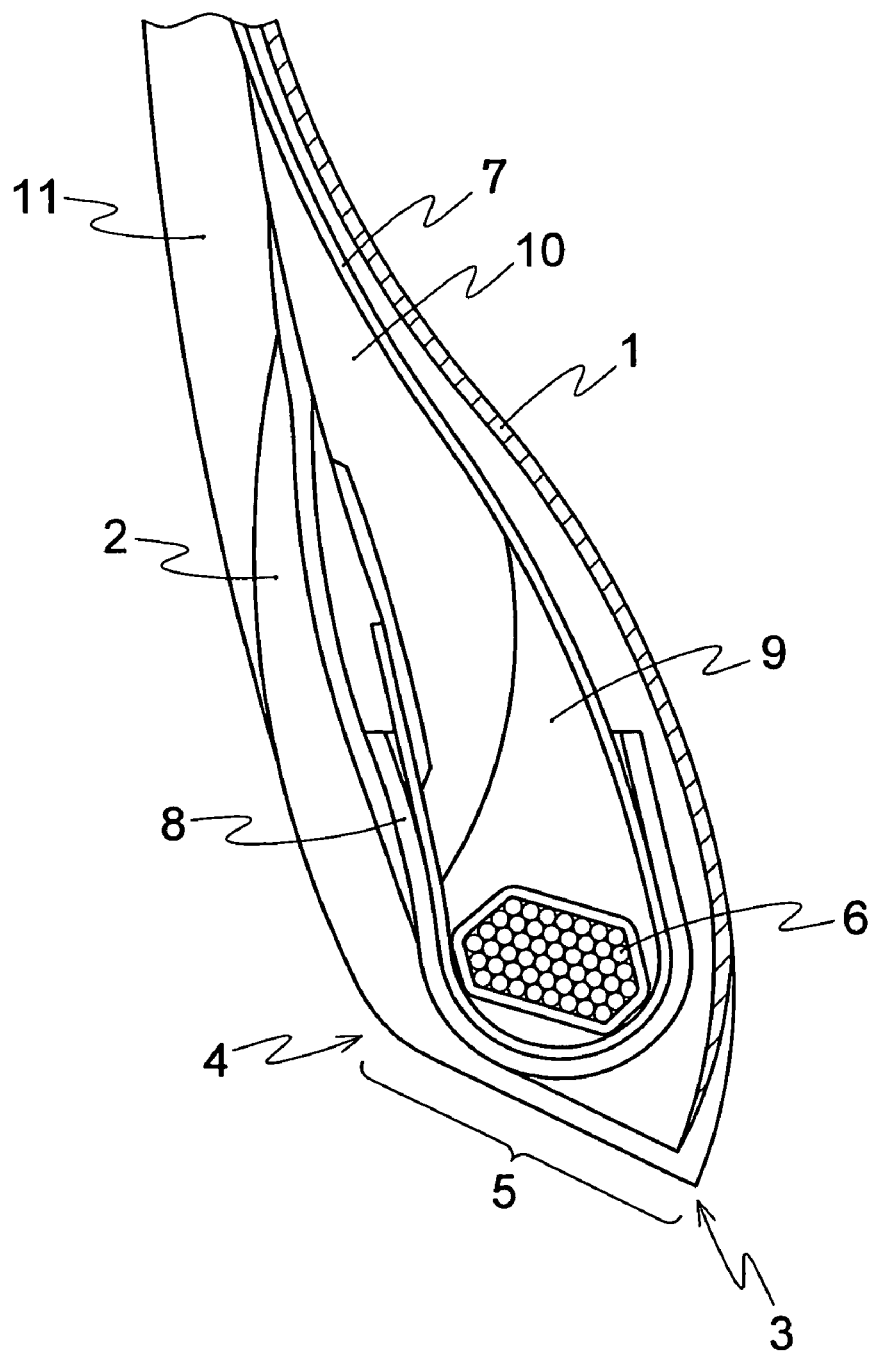
FIG. 3 is a cross sectional view depicting the bead of a conventional pneumatic tire.

Air permeability resistance was the same in Examples 14 to 20 and in Comparative Example 5, as the inner liner was extended to the bead toe. In a tire having an inner liner of the composition of Comparative Example 5 which is positioned so that the end of the inner liner is at the usual position (that is, the chafer rubber is located on the inner liner side) as shown in FIG. 3, the air permeability resistance was a poor value of 85.

According to the present invention, by using a composite material comprising rubber, polyolefin and nylon for chafer rubber on the inner liner side, air permeability resistance of a pneumatic tire can be improved while preventing chipping of the bead toe.

Also, according to the present invention, by using a composite material comprising rubber, polyolefin and nylon for the inner liner, the problem of toe-chip does not occur even when the inner liner is extended to the bead toe and air permeability resistance of a pneumatic tire can be improved.

What is claimed is:

1. A pneumatic tire having a bead with a bead toe and a bead core, and having an inner liner and a chafer rubber, said chafer rubber containing a chafer rubber portion comprising a rubber composition containing a composite material comprising a ternary graft copolymer of rubber-polyolefin-particulate nylon; the content of the particulate nylon being 1 to 40 parts by weight based on 100 parts by weight of the total rubber component in said rubber composition, and said rubber being butyl rubber or halogenated butyl rubber, wherein said chafer rubber portion extends along the inner liner from the bead toe to a location adjacent the bead core; and wherein said ternary graft copolymer does not contain fibrous nylon.

2. A pneumatic tire having a bead with a bead toe and a bead core, and having an inner liner and an outer side wall, said inner liner extending to at least the bead toe, said innerliner comprising a rubber composition containing a composite material comprising a ternary graft copolymer of rubber-polyolefin-particulate nylon; said composite material being contained so that the content of the particulate nylon is 1 to 40 parts by weight based on 100 parts by weight of the total rubber component in said rubber composition, and said rubber is butyl rubber or halogenated butyl rubber; and wherein said ternary graft copolymer does not contain fibrous nylon.

3. The pneumatic tire of claim 1 or 2, wherein the rubber composition comprises 25 to 50% by weight rubber, 15 to 35% by weight polyolefin and 25 to 40% by weight particulate nylon.

4. The pneumatic tire of claim 1 or claim 2, wherein the particulate nylon has a particle size of 0.5 μm to 5 μm.

* * * * *